United States Patent
Fujimura et al.

(10) Patent No.: US 11,325,851 B2
(45) Date of Patent: May 10, 2022

(54) DILUTED CHEMICAL LIQUID PRODUCTION APPARATUS CAPABLE OF CONTROLLING PH AND OXIDATION-REDUCTION POTENTIAL

(71) Applicant: KURITA WATER INDUSTRIES LTD., Tokyo (JP)

(72) Inventors: Yu Fujimura, Tokyo (JP); Nobuko Gan, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 201 days.

(21) Appl. No.: 16/492,947

(22) PCT Filed: Sep. 12, 2017

(86) PCT No.: PCT/JP2017/032790
§ 371 (c)(1),
(2) Date: Sep. 11, 2019

(87) PCT Pub. No.: WO2018/179492
PCT Pub. Date: Oct. 4, 2018

(65) Prior Publication Data
US 2020/0017384 A1 Jan. 16, 2020

(30) Foreign Application Priority Data
Mar. 30, 2017 (JP) .............................. JP2017-068601

(51) Int. Cl.
*B01D 19/00* (2006.01)
*B01D 61/00* (2006.01)
(Continued)

(52) U.S. Cl.
CPC ................ *C02F 1/66* (2013.01); *B01D 19/00* (2013.01); *B01D 61/00* (2013.01); *C02F 1/20* (2013.01);
(Continued)

(58) Field of Classification Search
CPC ...... C02F 1/66; C02F 1/20; C02F 1/68; C02F 2103/04; C02F 2103/346; C02F 2209/40;
(Continued)

(56) References Cited

U.S. PATENT DOCUMENTS 4,320,180 A * 3/1982 Nozaki .................... H01M 8/18
429/418
5,635,053 A * 6/1997 Aoki .................. H01L 21/02052
205/746

(Continued)

FOREIGN PATENT DOCUMENTS

CN 1351514 5/2002
CN 101970137 2/2011
(Continued)

OTHER PUBLICATIONS

"International Search Report (Form PCT/ISA/210) of PCT/JP2017/032790," dated Nov. 21, 2017, with English translation thereof, pp. 1-4.

(Continued)

*Primary Examiner* — Joseph W Drodge
(74) *Attorney, Agent, or Firm* — JCIPRNET

(57) ABSTRACT

A diluted chemical liquid production apparatus has a structure that has a platinum group metal carrying resin column, a membrane-type deaeration apparatus and a gas dissolving membrane apparatus, which are sequentially provided in a supply line of ultrapure water; and has a pH adjuster injection device and an oxidation-reduction potential adjuster injection device, which are provided between the platinum group metal carrying resin column and the membrane-type deaeration apparatus. An inert gas source is connected to a gaseous phase side of the membrane-type deaeration apparatus, and an inert gas source is also connected to the gaseous phase side of the gas dissolving membrane apparatus; and a discharge line communicates (Continued)

with the gas dissolving membrane apparatus. A pH meter and an ORP meter are provided in the discharge line. Such a diluted chemical liquid production apparatus can control a pH and an oxidation-reduction potential.

4 Claims, 1 Drawing Sheet

(51) Int. Cl.
  *C02F 1/20* (2006.01)
  *C02F 1/66* (2006.01)
  *C02F 1/72* (2006.01)
  *C02F 103/34* (2006.01)
(52) U.S. Cl.
  CPC ........ *C02F 1/725* (2013.01); *C02F 2103/346* (2013.01); *C02F 2209/04* (2013.01); *C02F 2209/06* (2013.01)
(58) Field of Classification Search
  CPC .......... C02F 2301/046; C02F 2303/185; C02F 1/686; C02F 2209/06; C02F 2209/04; C02F 1/685; C02F 1/70; C02F 1/72; C02F 1/722; C02F 1/725; C02F 9/00; C02F 61/00; C02F 2303/18; H01L 21/304; B01D 19/00; B01D 19/0005; B01D 19/0031; B01D 19/0036; B01D 61/00; B08B 3/10; B08B 3/12; B01J 20/0225; B01J 39/02; B01J 41/02
  See application file for complete search history.

(56) References Cited

U.S. PATENT DOCUMENTS

| | | | |
|---|---|---|---|
| 6,021,791 A * | 2/2000 | Dryer | B01D 61/002 134/100.1 |
| 6,391,209 B1 * | 5/2002 | Belongia | C25D 21/18 204/DIG. 13 |
| 6,416,586 B1 * | 7/2002 | Ohmi | B08B 3/08 134/1 |
| 6,464,867 B1 * | 10/2002 | Morita | C02F 1/78 210/202 |
| 10,759,678 B2 * | 9/2020 | Fujimura | C02F 1/20 |
| 2003/0094610 A1 * | 5/2003 | Aoki | C01B 3/00 257/48 |
| 2003/0116174 A1 * | 6/2003 | Park | C11D 7/02 134/1.3 |
| 2003/0132104 A1 | 7/2003 | Yamashita et al. | |
| 2009/0074611 A1 * | 3/2009 | Monzyk | C01B 15/027 422/29 |
| 2009/0127201 A1 * | 5/2009 | Kobayashi | B01J 31/08 210/668 |
| 2010/0044311 A1 * | 2/2010 | Kobayashi | B01D 61/16 210/638 |
| 2011/0024361 A1 * | 2/2011 | Schwartzel | C02F 1/46109 210/739 |
| 2011/0042281 A1 | 2/2011 | Tokoshima et al. | |
| 2011/0198236 A1 * | 8/2011 | Sumita | C02F 1/4676 205/746 |
| 2012/0097595 A1 * | 4/2012 | Tokoshima | C02F 1/705 210/251 |
| 2016/0233082 A1 | 8/2016 | Yano et al. | |
| 2017/0044029 A1 * | 2/2017 | Nakano | B01D 61/58 |
| 2017/0327396 A1 * | 11/2017 | Ikuno | B01D 15/363 |
| 2020/0017384 A1 * | 1/2020 | Fujimura | C02F 1/20 |
| 2020/0048116 A1 * | 2/2020 | Gan | C02F 1/20 |

FOREIGN PATENT DOCUMENTS

| | | |
|---|---|---|
| CN | 105340067 | 2/2016 |
| JP | 2000216130 | 8/2000 |
| JP | 2003-136077 | 5/2003 |
| JP | 2003205299 | 7/2003 |
| JP | 2005019876 | 1/2005 |
| JP | 2009219995 | 10/2009 |
| JP | 2010-17633 | 1/2010 |
| JP | 2012063303 | 3/2012 |
| JP | 2016-76590 | 5/2016 |
| WO | 2015045975 | 4/2015 |

OTHER PUBLICATIONS

"Office Action of Taiwan Counterpart Application", dated Dec. 23, 2020, with English translation thereof, p. 1-p. 13.
Office Action of China Counterpart Application, with English translation thereof, dated Aug. 26, 2021, pp. 1-14.

* cited by examiner

DILUTED CHEMICAL LIQUID PRODUCTION APPARATUS CAPABLE OF CONTROLLING PH AND OXIDATION-REDUCTION POTENTIAL

CROSS-REFERENCE TO RELATED APPLICATION

This application is a 371 application of an international PCT application serial no. PCT/JP2017/032790, filed on Sep. 12, 2017, which claims the priority benefit of Japan application JP2017-068601, filed on Mar. 30, 2017. The entirety of each of the abovementioned patent applications is hereby incorporated by reference herein and made a part of this specification.

TECHNICAL FIELD

The present invention relates to a diluted chemical liquid production apparatus that is used in a field of electronics industry and the like, and particularly relates to a high-purity diluted chemical liquid production apparatus capable of controlling a pH and an oxidation-reduction potential.

BACKGROUND ART

In a process of manufacturing an electronic component such as LSI, a step of treating an object to be treated is repeated which has a fine structure. Now, it is important for maintaining a quality of a product and improving the yield to clean a surface of a treated body such as a wafer or a substrate for the purpose of removing fine particles, organic substances, metals, natural oxide films and the like which adhere thereto, and thereby achieving and maintaining a high degree of cleanliness. This cleaning is performed with the use of a cleaning liquid, for example, such as a mixed liquid of sulfuric acid and a hydrogen peroxide solution, and a hydrofluoric acid solution; and after the cleaning, a rinse is performed with the use of ultrapure water. High purity is required for the ultrapure water and a chemical liquid which are supplied for cleaning such as this rinse. Furthermore, in recent years, the number of cleaning times has increased due to the miniaturization of semiconductor devices, the diversification of materials, and the complication of processes.

Generally, an ultrapure water production apparatus is used for producing the ultrapure water, which includes a pretreatment system, a primary pure water system, and a secondary pure water system (subsystem). In the rinse that uses ultrapure water which has been produced in such an ultrapure water production apparatus, there is a problem that a thin oxide film is formed on a wafer surface by dissolved oxygen in the ultrapure water. In order to solve this point, in Patent Documents 1 and 2, a method is proposed that performs cleaning such as a rinse, by use of water of which the hydrogen peroxide is decreased with the use of hydrogen-dissolved water in which hydrogen gas has been dissolved in ultrapure water from which dissolved oxygen has been removed by degassing. In addition, in Patent Document 3, an apparatus is proposed that dissolves an electro-conductive substance in ultrapure water of a raw material, then passes the ultrapure water through an ion exchange column filled with an organic porous ion exchanger, and provides an electro-conductive aqueous solution having a stable concentration.

By the way, in a process of manufacturing a semiconductor or a liquid crystal, a semiconductor wafer or a glass substrate is cleaned with the use of the ultrapure water from which impurities have been highly removed. In the cleaning of the semiconductor wafer, which uses such ultrapure water, it is known that there are problems that as semiconductor devices have become finer in recent years, corrosion of wiring metals is caused by a trace amount of hydrogen peroxide and the like which are contained in the ultrapure water, and that when the ultrapure water having the high specific resistance is used, static electricity tends to be easily generated at the time of cleaning, and leads to an electrostatic discharge damage in an insulating film and the reattachment of the fine particles. For this reason, in recent years, carbon dioxide or a chemical liquid such as ammonia is added to the ultrapure water to thereby adjust the pH, and the problems as described above are addressed.

PRIOR ART DOCUMENT

Patent Document

[Patent Document 1] JP2003-136077A
[Patent Document 2] JP2010-17633A
[Patent Document 3] JP2016-76590A

SUMMARY OF THE INVENTION

Problems to be Solved by the Invention

However, the technologies described in Patent Documents 1 to 3 cannot remove the dissolved gas species contained in the chemical liquid to be added, accordingly it is difficult to cope with various problems which occur during the cleaning of the ultrafine-processed semiconductor device.

Then, the present inventors have examined solutions to various problems which occur during the cleaning of the ultrafine-processed semiconductor device, and as a result, have found that a trace amount of hydrogen peroxide can be effectively used when the oxidation-reduction potential is adjusted. In addition, for that purpose, it is desirable to be capable of controlling the pH and the oxidation-reduction potential, but conventionally, there has not been such a diluted chemical liquid production apparatus capable of controlling the pH and the oxidation-reduction potential.

The present invention is designed with respect to the above described problems, and an object is to provide a high-purity diluted chemical liquid production apparatus capable of controlling the pH and the oxidation-reduction potential.

Means for Solving the Problems

The present invention is designed with respect to the above described object, and provides a diluted chemical liquid production apparatus which includes: a platinum group metal carrying resin column and a membrane-type deaeration apparatus, which are sequentially provided in an ultrapure water supply line; and a pH adjuster injection device for adding a pH adjuster into ultrapure water and an oxidation-reduction potential adjuster injection device for adding an oxidation-reduction potential adjuster, which are provided between the platinum group metal carrying resin column and the membrane-type deaeration apparatus (Invention 1).

The apparatus according to the invention (Invention 1) removes a very small amount of hydrogen peroxide contained in the ultrapure water by passing ultrapure water to the platinum group metal carrying resin column from the ultrapure water supply line; subsequently injects the pH adjuster and the oxidation-reduction potential adjuster to prepare the diluted chemical liquid; then deaerates the solution with the membrane-type deaeration apparatus to remove the dissolved oxygen in the diluted chemical liquid, and thereby to eliminate an influence of dissolved hydrogen peroxide in raw water; also removes the dissolved oxygen and the like in the pH adjuster and the oxidation-reduction potential adjuster; and can safely produce and supply a high-purity diluted chemical liquid which has reflected a desired pH and oxidation-reduction potential.

In the above described invention (Invention 1), it is preferable to provide an inert gas dissolving apparatus in a later stage of the membrane-type deaeration apparatus (invention 2).

The apparatus according to the invention (Invention 2) dissolves an inert gas in a high-purity diluted chemical liquid, thereby makes it difficult for a gas component to dissolve in the obtained diluted chemical liquid, and can maintain a high-purity diluted chemical liquid which has accurately reflected a desired pH and oxidation-reduction potential.

In the above described inventions (Inventions 1 and 2), it is preferable that the membrane-type deaeration apparatus is a type of inhaling an inert gas (Invention 3).

The apparatus according to the invention (Invention 3) inhales an inert gas to a gaseous phase side of the membrane-type deaeration apparatus and supplies a diluted chemical liquid to a liquid phase side, to thereby effectively deaerate dissolved gas such as dissolved oxygen; accordingly can further decrease the concentration of the dissolved oxygen in the obtained diluted chemical liquid; and can maintain the high-purity diluted chemical liquid which has reflected the desired pH and oxidation-reduction potential.

In the above described inventions (Inventions 1 to 3), it is preferable to provide pH measuring means and oxidation-reduction potential measuring means in a later stage of the membrane-type deaeration apparatus (Invention 4).

The apparatus according to the invention (Invention 4) can control injection amounts of a pH adjuster and an oxidation-reduction potential adjuster so that the obtained diluted chemical liquid has the desired pH and oxidation-reduction potential, on the basis of the measured results by the pH measuring means and the oxidation-reduction potential measuring means.

Furthermore, in the above described inventions (Inventions 1 to 4), it is preferable that the pH adjuster is ammonia, and the oxidation-reduction potential adjuster is hydrogen peroxide (Invention 5).

The apparatus according to the invention (Invention 5) enables the diluted chemical liquid to have the desired pH and oxidation-reduction potential, due to such reasons that ammonia does not contain metal ions and the like, accordingly facilitates adjustment of the pH in the alkaline region, and is unlikely to become an obstructive factor, and further that hydrogen peroxide facilitates adjustment of the oxidation-reduction potential in the positive region.

Effect of the Invention

The diluted chemical liquid production apparatus according to the present invention firstly removes very small amounts of hydrogen peroxide and dissolved oxygen contained in the ultrapure water by the platinum group metal carrying resin column; subsequently injects the pH adjuster and the oxidation-reduction potential adjuster to prepare the diluted chemical liquid; then deaerates the solution with the membrane-type deaeration apparatus to remove the dissolved oxygen in the diluted chemical liquid, and thereby eliminates an influence of dissolved hydrogen peroxide in raw water; and can safely produce and supply the high-purity diluted chemical liquid which has reflected the desired pH and oxidation-reduction potential.

EMBODIMENTS FOR CARRYING OUT THE INVENTION

Hereinafter, one embodiment of the diluted chemical liquid production apparatus of the present invention will be described in detail with reference to the attached drawings.

[Diluted Chemical Liquid Production Apparatus]

Figure 1:
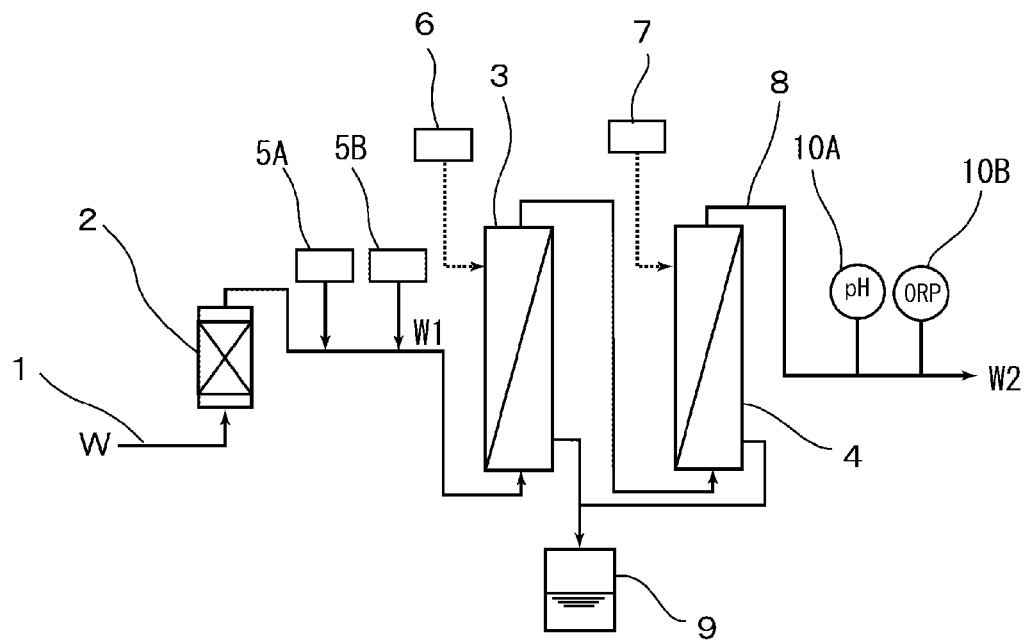
FIG. 1 is a schematic view showing a diluted chemical liquid production apparatus according to one embodiment of the present invention.

FIG. 1 shows a diluted chemical liquid production apparatus according to the present embodiment; and in FIG. 1, the diluted chemical liquid production apparatus has a structure that has a platinum group metal carrying resin column 2, a membrane-type deaeration apparatus 3 and a gas dissolving membrane apparatus 4, which are sequentially provided in a supply line 1 of ultrapure water W; and a pH adjuster injection device 5A and an oxidation-reduction potential adjuster injection device 5B, which are provided between the platinum group metal carrying resin column 2 and the membrane-type deaeration apparatus 3. An inert gas source 6 is connected to a gaseous phase side of the membrane-type deaeration apparatus 3 and an inert gas source 7 is also connected to the gaseous phase side of the gas dissolving membrane apparatus 4; and a discharge line 8 communicates with the gas dissolving membrane apparatus 4. Incidentally, reference numeral 9 denotes a drain tank of the membrane-type deaeration apparatus 3 and the gas dissolving membrane apparatus 4. In addition, in the present embodiment, a pH meter 10A of pH measuring means and an ORP meter 10B of oxidation-reduction potential measuring means are each provided at some midpoint in the discharge line 8.

<Ultrapure Water>

In the present embodiment, it is preferable for ultrapure water W which is raw water to have, for example, resistivity: 18.1 MΩ-cm or higher, fine particles: 1000 pieces/L or less with particle size of 50 nm or larger, viable bacteria: 1 piece/L or less, TOC (Total Organic Carbon): 1 μg/L or less, total silicon: 0.1 μg/L or less, metals: 1 ng/L or less, ions: 10 ng/L or less, hydrogen peroxide: 30 μg/L or less, and water temperature: 25±2° C.

<Platinum Group Metal Carrying Resin Column>

(Platinum Group Metal)

In the present embodiment, examples of a platinum group metal carried on a platinum group metal carrying resin which is used for the platinum group metal carrying resin column 2 include ruthenium, rhodium, palladium, osmium, iridium and platinum. These platinum group metals can be used solely or in combination with one or more other types, and can also be used as an alloy of two or more types; or a purified product of a naturally produced mixture can also be used without separating the mixture into single substances. Among the metals, each one of the platinum, the palladium and the platinum/palladium alloy, or a mixture of two or more types thereof shows strong catalytic activity, and accordingly can be preferably used. In addition, nano-order fine particles of these metals can be particularly suitably used.

(Carrier Resin)

In the platinum group metal carrying resin column 2, as a carrier resin for carrying the platinum group metal thereon, an ion exchange resin can be used. Among the resins, an anion exchange resin can be particularly preferably used. The platinum group metal is negatively charged; and accordingly is stably carried on the anion exchange resin and resists exfoliating. It is preferable that an exchange group of the anion exchange resin has an OH form. An anion exchange resin having the OH form makes the resin surface alkaline and promotes a decomposition of hydrogen peroxide.

<Membrane-Type Deaeration Apparatus>

In the present embodiment, as the membrane-type deaeration apparatus 3, such an apparatus can be used as to flow ultrapure water W in one side (liquid phase side) of a deaeration membrane, and exhaust the other side (gaseous phase side) by a vacuum pump, thereby to make dissolved oxygen permeate through the membrane and migrate to the gaseous phase chamber side, and to remove the dissolved oxygen. Incidentally, it is preferable to connect an inert gas source 6 of nitrogen or the like in the vacuum side (gaseous phase side) of this membrane and improve the deaeration performance. The deaeration membrane is acceptable as long as gases such as oxygen, nitrogen and steam pass therethrough but water does not pass therethrough; and examples of the deaeration membrane include a silicone rubber-based deaeration membrane, a polytetrafluoroethylene-based deaeration membrane, a polyolefin-based deaeration membrane and a polyurethane-based deaeration membrane. Various commercially available membranes can be used as the deaeration membrane.

<Gas Dissolving Membrane Apparatus>

In the present embodiment, the gas dissolving membrane apparatus 4 is not limited in particular as long as the device flows ultrapure water W in one side (liquid phase side) of the gas permeable membrane, passes gas in the other side (gaseous phase side), and transfers the gas to the liquid phase side to dissolve the gas in the liquid; and can use polymer membranes of, for example, polypropylene, polydimethylsiloxane, a polycarbonate-polydimethylsiloxane block copolymer, a polyvinylphenol-polydimethylsiloxane-polysulfone block copolymer, poly(4-methylpentene-1), poly(2,6-dimethylphenylene oxide) and polytetrafluoroethylene. In the present embodiment, an inert gas such as nitrogen is used as the gas to be dissolved in the water, and this inert gas is supplied from the inert gas source 7.

<pH Adjuster>

In the present embodiment, the pH adjuster which is injected from the pH adjuster injection device 5A is not limited in particular, and when the pH is adjusted to lower than pH 7, hydrochloric acid, nitric acid, sulfuric acid, hydrofluoric acid or the like can be used. In addition, when the pH is adjusted to pH 7 or higher, ammonia can be used. Incidentally, a solution of an alkali metal such as sodium hydroxide is not preferable because of containing a metal component. For example, when a cleaning liquid for a transition metal or a semiconductor material is prepared, it is preferable to adjust the pH to pH 7 or higher so as to suppress the elution of these materials, and accordingly, it is preferable to use ammonia.

<Oxidation-Reduction Potential Adjuster>

In the present embodiment, the oxidation-reduction potential adjuster which is injected from the oxidation-reduction potential adjuster injection device 5B is not limited in particular, but potassium ferricyanide, potassium ferrocyanide and the like are not preferable because of containing a metal component. In addition, a gas component is not suitable because of being removed by the membrane-type deaeration apparatus in a later stage. Accordingly, in order to adjust the oxidation-reduction potential to the positive side, it is preferable to use a hydrogen peroxide solution. In order to adjust the oxidation-reduction potential to the negative side, it is preferable to use oxalic acid or the like. For example, when the cleaning liquid for the transition metal or the semiconductor material is prepared, it is preferable to adjust the oxidation-reduction potential to the positive side so as to suppress the elution of these materials. Based on the above reasons, it is preferable to use the hydrogen peroxide solution.

[Diluted Chemical Liquid Production Method]

A high-purity diluted chemical liquid production method will be described below that uses the diluted chemical liquid production apparatus capable of controlling the pH and the oxidation-reduction potential of the present embodiment having the structure as described above.

Firstly, ultrapure water W of raw water is supplied from a supply line 1 to the platinum group metal carrying resin column 2. In this platinum group metal carrying resin column 2, the platinum group metal decomposes and removes hydrogen peroxide in the ultrapure water W by the catalytic action thereof. However, in this case, the dissolved oxygen in the ultrapure water W shows a tendency of slight increase due to the decomposition of hydrogen peroxide.

Next, a pH adjuster is injected into the ultrapure water W from the pH adjuster injection device 5A, and an oxidation-reduction potential adjuster is injected from the oxidation-reduction potential adjuster injection device 5B to prepare a diluted chemical liquid W1. As for the amounts (flow rates) of the pH adjuster and the oxidation-reduction potential adjuster to be injected, it is acceptable to control the injection amounts so that the diluted chemical liquid W1 to be obtained has a desired pH and oxidation-reduction potential, according to the flow rate of the ultrapure water W by not-shown control means. Here, the diluted chemical liquid W1 results in containing the dissolved oxygen in the ultrapure water W and the dissolved oxygen introduced from the pH adjuster and the oxidation-reduction potential adjuster.

Subsequently, this diluted chemical liquid W1 is supplied to the membrane-type deaeration apparatus 3. In the membrane-type deaeration apparatus 3, the diluted chemical liquid W1 is passed to a liquid phase chamber side of the liquid phase chamber and the gaseous phase chamber which are composed by a hydrophobic gas permeable membrane, and the gaseous phase chamber is also depressurized by a not-shown vacuum pump; and thereby a dissolved gas such as dissolved oxygen, which is contained in the diluted chemical liquid W1, is migrated to the gaseous phase chamber through the hydrophobic gas permeable membrane, and is thereby removed. At this time, the condensed water which is produced in the gaseous phase chamber side is collected in a drain tank 9. In the present embodiment, an inert gas is supplied to the gaseous phase chamber of the membrane-type deaeration apparatus 3 from the inert gas source 6 under a reduced pressure as a sweep gas, but the supply of the inert gas is desirable in the point that thereby the deaeration effect is enhanced and an effect of removing the dissolved oxygen for the diluted chemical liquid W1 is further enhanced. The inert gas is not limited in particular, and a rare gas, a nitrogen gas or the like can be used. In particular, nitrogen can be suitably used, because of being readily available and inexpensive even at high purity levels. Thereby, the supply of the inert gas can decrease the concentration of the dissolved oxygen in the diluted chemical liquid W1 to a very low level. Thus, the pH adjuster and the oxidation-reduction potential adjuster are not directly deaerated but are deaerated after the diluted chemical liquid W1 has been produced, and thereby the risk of the leakage of the chemical liquid and the like can be reduced at the time when these adjusters are vacuum deaerated.

Then, in the present embodiment, the deaerated diluted chemical liquid W1 is supplied to the gas dissolving membrane apparatus 4. In the gas dissolving membrane apparatus 4, the diluted chemical liquid W1 is passed in the liquid phase chamber side of the liquid phase chamber and the gaseous phase chamber which are composed by the hydrophobic gas permeable membrane, and also an inert gas is supplied to the gaseous phase chamber from the inert gas source 7 under such a condition that a pressure in the gaseous phase chamber side becomes higher than that of the liquid phase chamber, and thereby the inert gas is transferred to the liquid phase chamber side to be dissolved in the diluted chemical liquid W1; and a final diluted chemical liquid (clean diluted chemical liquid) W2 can be obtained. At this time, the condensed water which is produced in the gaseous phase chamber side is collected in the drain tank 9. The dissolution of the inert gas can suppress the re-dissolution of the gas species into the clean diluted chemical liquid W2, and the clean diluted chemical liquid W2 can be maintained in a state in which dissolved oxygen is decreased. The inert gas is not limited in particular, and a rare gas, a nitrogen gas or the like can be used. In particular, nitrogen can be suitably used, because of being readily available and inexpensive even at high purity levels. A method using such a gas dissolving membrane module can easily dissolve the inert gas in water, and also can adjust and manage the concentration of the dissolved gas.

In the present embodiment, a pH of the clean diluted chemical liquid W2 is measured by the pH meter 10A, and an oxidation-reduction potential thereof is measured by the ORP meter 10B, and it is monitored whether or not the clean diluted chemical liquid W2 has the desired pH and the oxidation-reduction potential, and the injection amounts of the pH adjuster injection device 5A and the oxidation-reduction potential adjuster injection device 5B can be controlled by not-shown control means so that the clean diluted chemical liquid W2 has the desired pH and oxidation-reduction potential.

The clean diluted chemical liquid W2 to be produced by the present embodiment as described above is supplied to a washing machine for electronic materials such as a silicon substrate for a semiconductor, a glass substrate for a liquid crystal, or a quartz substrate for a photomask. Such a clean diluted chemical liquid W2 not only has the desired pH and oxidation-reduction potential as described above, but also can be controlled to such very low levels that the hydrogen peroxide concentration is 1 ppb or lower and the dissolved oxygen concentration is 100 ppb or lower; and can suppress the re-dissolution of gas species into itself to maintain the low state, and can keep itself in a suitable state for cleaning.

In the above, the present invention has been described with reference to the accompanying drawings, but the present invention is not limited to the above described embodiment, and various modifications can be made. For example, instruments such as a flow meter, a thermometer, a pressure gauge, and a gas concentration meter can be provided at an arbitrary place. Furthermore, it is also acceptable to provide control valves for flow of chemical liquids on a pH adjuster injection device 5A and an oxidation-reduction potential adjuster injection device 5B, and to provide control devices such as a gas flow control valve on the inert gas source 6 and the inert gas source 7, as needed. Furthermore, another chemical liquid injection device may be provided in the diluted chemical liquid production apparatus.

EXAMPLE

The invention will be described further in detail with reference to the following specific examples.

Example 1

The diluted chemical liquid production apparatus was configured as in the configuration shown in FIG. 1; ultrapure water W was supplied from a supply line 1 at a flow rate of 3 L/min, and was passed to a platinum group metal carrying resin column 2 which carried platinum as a platinum group metal thereon, then an aqueous ammonia solution (concentration of 28 wt %) was supplied from the pH adjuster injection device 5A so that the pH was in a range of 9.5 to 10.2, and at the same time, a hydrogen peroxide solution (concentration of 5 wt %) was supplied from the oxidation-reduction potential adjuster injection device 5B so that the oxidation-reduction potential was 400 mV at a hydrogen peroxide concentration of 10 ppm; and the diluted chemical liquid W1 was prepared. The diluted chemical liquid W1 was treated in a membrane-type deaeration apparatus 3 and a gas dissolving membrane apparatus 4, and a clean diluted chemical liquid W2 was produced. The pH of this clean diluted chemical liquid W2 was measured with a pH meter 10A, and an oxidation-reduction potential was also measured with an ORP meter 10B; and furthermore, the concentration of hydrogen peroxide ($H_2O_2$) was measured with a hydrogen peroxide concentration meter. The results are shown in Table 1 together with the dissolved oxygen concentration of the clean diluted chemical liquid W2.

Incidentally, Liqui-Cel (made by Celgard LLC) was used as the membrane-type deaeration apparatus 3, and nitrogen gas was circulated at a flow rate of 10 L/min as a sweep gas. In addition, "MHF 1704" made by Mitsubishi Rayon Co., Ltd. was used as the gas dissolving membrane apparatus 4, and nitrogen gas was supplied at a flow rate of 0.1 L/min.

Comparative Example 1

Figure 2:
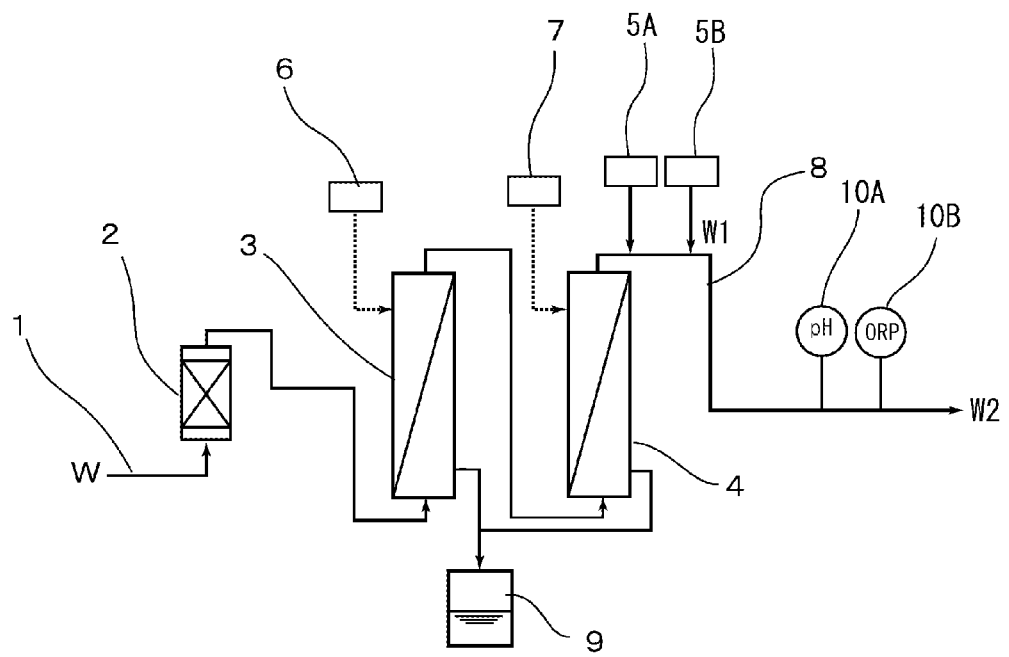
FIG. 2 is a schematic view showing a diluted chemical liquid production apparatus, in Comparative Example 1.

As is shown in FIG. 2, an diluted chemical liquid production apparatus was configured similarly to the apparatus shown in FIG. 1, except that in a later stage of the gas dissolving membrane apparatus 4 in the apparatus shown in FIG. 1, the aqueous ammonia solution (concentration of 28 wt %) was supplied from the pH adjuster injection device 5A so that the pH was in a range of 9.5 to 10.2, and also an aqueous hydrogen peroxide solution (concentration of 5 wt %) was supplied from the oxidation-reduction potential adjuster injection device 5B so that the oxidation-reduction potential was 400 mV at a hydrogen peroxide concentration of 10 ppm; and a diluted chemical liquid W1 was prepared. A clean diluted chemical liquid W2 was produced by this diluted chemical liquid production apparatus on the same conditions as those in Example 1. The pH of this clean diluted chemical liquid W2 was measured with a pH meter 10A and an oxidation-reduction potential was measured with an ORP meter 10B, and furthermore, the concentration of hydrogen peroxide ($H_2O_2$) was measured with a hydrogen peroxide concentration meter. The results are shown in Table 1 together with the dissolved oxygen concentration of the clean diluted chemical liquid W2.

Comparative Example 2

An clean diluted chemical liquid W2 was produced similarly to that in Comparative Example 1, except that an aqueous ammonia solution (concentration of 28 wt %) was supplied from the pH adjuster injection device 5A in the apparatus of FIG. 2 so that the pH was in a range of 7.4 to 9.5, without supplying a hydrogen peroxide concentration solution from the pH adjuster injection device 5A, and the hydrogen peroxide solution was not supplied from the oxidation-reduction potential adjuster injection device 5B, in Comparative Example 1. The pH of this clean diluted chemical liquid W2 was measured with a pH meter 10A and an oxidation-reduction potential was measured with an ORP meter 10B. The results are shown in Table 1 together with the dissolved oxygen concentration of the clean diluted chemical liquid W2. Incidentally, a pH, an oxidation-reduction potential and a dissolved oxygen concentration of the ultrapure water W are shown in Table 1, which is a reference example for comparison.

TABLE 1

| | Example No. | | | |
|---|---|---|---|---|
| | Example 1 | Comparative Example 1 | Comparative Example 2 | Reference Example |
| Dissolved oxygen concentration | <100 ppb | >1 ppm | >1 ppm | <100 ppb |
| pH | 9.6 | 8.8 | 8.5 | 6.8 |
| ORP | +400 mV | +400 mV | +200 mV | +200 mV |
| $H_2O_2$ concentration | 9.8 ppm | 9.7 ppm | <0.001 ppm | <0.001 ppm |

As is clear from Table 1, in the diluted chemical liquid production apparatus of Example 1, the dissolved oxygen concentration has been lower than 100 ppb, the pH has been within a target range, and the ORP and the hydrogen peroxide concentration also have been values very close to the target values. On the other hand, in the diluted chemical liquid production apparatus of Comparative Example 1, the hydrogen peroxide has been close to the target value, but the dissolved oxygen concentration has been 1 ppm or higher, and the pH has been outside the target value. This is considered to be a result affected by the dissolved oxygen that dissolves in the aqueous ammonia solution and the hydrogen peroxide solution which are supplied from the pH adjuster injection device 5A and the oxidation-reduction potential adjuster injection device 5B, respectively. In addition, in Comparative Example 2, a hydrogen peroxide solution has not been added, and accordingly the concentration of the hydrogen peroxide has been smaller than the target value, the dissolved oxygen concentration has been 1 ppm or higher, and the pH has been outside the target value.

DESCRIPTION OF REFERENCE SYMBOLS

1 Supply line
2 Platinum group metal carrying resin column
3 Membrane-type deaeration apparatus
4 Gas dissolving membrane apparatus
5A pH adjuster injection device
6B Oxidation-reduction potential adjuster injection device
6 Inert gas source
7 Inert gas source
8 Discharge line
9 Drain tank
10A pH meter (pH measuring means)
10B ORP meter (Oxidation-reduction potential measuring means)
W Ultrapure water
W1 Diluted chemical liquid
W2 Clean diluted chemical liquid

The invention claimed is:

1. A diluted chemical liquid production apparatus comprising:
   a platinum group metal carrying resin column and a membrane type deaeration apparatus, which are sequentially provided in an ultrapure water supply line; and
   a pH adjuster injection device for adding a pH adjuster into ultrapure water and an oxidation-reduction potential adjuster injection device for adding an oxidation-reduction potential adjuster, which are provided between the platinum group metal carrying resin column and the membrane type deaeration apparatus, and a diluted chemical liquid is obtained by adding the pH adjuster and the oxidation-reduction potential adjuster into ultrapure water;
   wherein the membrane type deaeration apparatus includes a liquid phase chamber for passing the diluted chemical liquid and a gaseous phase chamber for removing a gas dissolved in the diluted chemical liquid composed by a hydrophobic gas permeable membrane;
   wherein an inert gas is provided into the membrane type deaeration apparatus, and
   wherein a final diluted chemical liquid is obtained by passing ultrapure water through the platinum group metal carrying resin column, the pH adjuster injection device, the oxidation-reduction potential adjuster injection device and the membrane type deaeration apparatus.

2. The diluted chemical liquid production apparatus according to claim 1, comprising a gas dissolving membrane apparatus for receiving the diluted chemical liquid deaerated by the membrane type deaeration apparatus.

3. The diluted chemical liquid production apparatus according to claim 1, comprising pH measuring means and oxidation-reduction potential measuring means for measuring the diluted chemical liquid deaerated by the membrane type deaeration apparatus.

4. The diluted chemical liquid production apparatus according to claim 1, wherein the pH adjuster is ammonia, and the oxidation-reduction potential adjuster is hydrogen peroxide.

* * * * *